US006292565B1

(12) United States Patent
Chamberlin et al.

(10) Patent No.: US 6,292,565 B1
(45) Date of Patent: Sep. 18, 2001

(54) ASSEMBLY INCLUDING A PHONE COVER

(75) Inventors: Davis W. Chamberlin, St. Paul; Robert J. Oliveira, Maplewood, both of MN (US)

(73) Assignee: Hearing Components, Inc., Oakdale, MN (US)

( * ) Notice: Subject to any disclaimer, the term of this patent is extended or adjusted under 35 U.S.C. 154(b) by 0 days.

(21) Appl. No.: 09/418,290

(22) Filed: Oct. 14, 1999

(51) Int. Cl.[7] .................................................... H04M 1/00

(52) U.S. Cl. ........................................... 379/452; 379/439

(58) Field of Search ................................... 379/452, 439, 379/447; 181/129

(56) References Cited

U.S. PATENT DOCUMENTS 4,953,567 * 9/1990 Ward .................................... 379/452
5,136,640 * 8/1992 Kim ...................................... 379/452
5,401,920 3/1995 Oliveira .............................. 181/135
5,545,859 8/1996 Ullrich ................................ 181/129
5,712,453 1/1998 Bungardt et al. .................... 181/135

FOREIGN PATENT DOCUMENTS 28 18 273 11/1979 (DE) .

* cited by examiner

*Primary Examiner*—Jack Chiang
(74) *Attorney, Agent, or Firm*—Crompton, Seager & Tufte, LLC

(57) ABSTRACT

An assembly that affords easy application of a phone cover of thin, flexible, resiliently stretchable material around a bulbous phone (e.g., a microphone or earphone such as an ear bud). The assembly includes the phone cover that defines a socket adapted to closely receive the phone, and also includes a frame of stiff material having a passageway from which the phone cover is supported with an inlet opening to the socket aligned with the passageway on the frame. The phone can be moved along the passageway into the socket in the phone cover, whereupon the phone cover is separated from the frame.

20 Claims, 5 Drawing Sheets

*Fig. 8*
*Fig. 9*
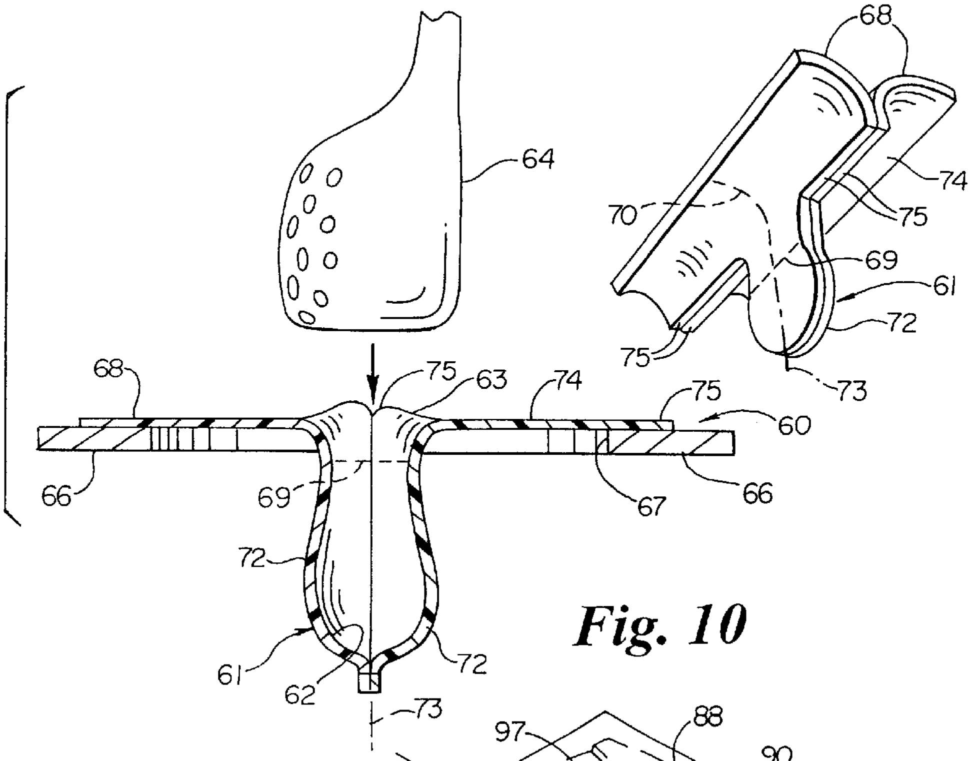
*Fig. 10*
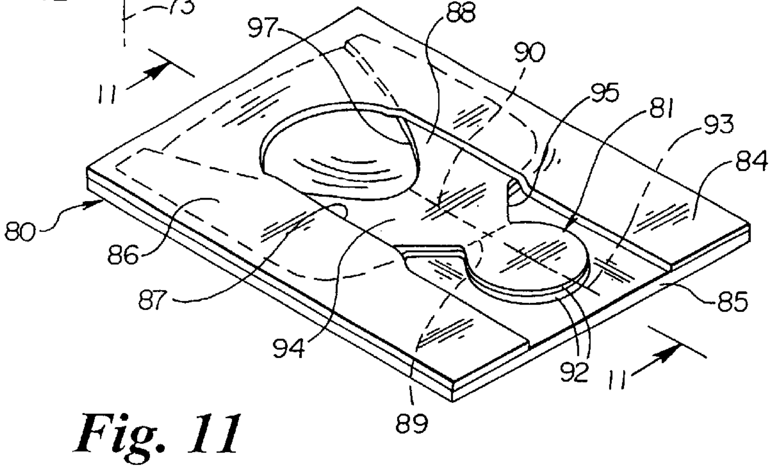
*Fig. 11*
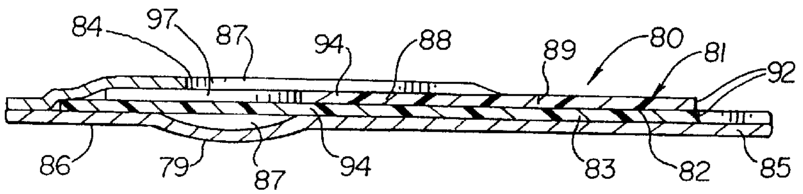

ASSEMBLY INCLUDING A PHONE COVER

FIELD OF THE INVENTION

The present invention relates to covers for bulbous phones including microphones and ear phones, and particularly including ear phones of the type called ear buds that are small speakers for radios, recorded music players, and the like, that are inserted into the bowl of the ear so that only the wearer of the ear bud can hear sound from the speaker. Such a phone cover is typically of thin, flexible, resiliently stretchable sound transmissive material, defines a socket, and is adapted to closely receive a phone inserted into the socket through an inlet opening.

BACKGROUND OF THE INVENTION

Small bulbous earphones, including a type called ear buds, are commonly used for radios, recorded music players, cell phones, walky-talkies, and the like. An ear bud can be inserted into the bowl of the ear so that only the wearer of the ear bud can hear sound transmitted through it. Covers of thin, flexible, resiliently flexible, sound transmissive material are available for such ear buds. Those covers define sockets adapted to closely receive car buds inserted into the sockets through inlet openings. Such a cover provides a cushion between the ear bud and an ear into which it is inserted, provides friction with the ear to help hold the ear bud in the ear, and provides a cerumen guard for the ear bud. It is sometimes desirable to change the cover on an ear bud, such as when the cover has collected an excessive amount of contaminants either from a users ear or from some other source when the covered ear bud is removed from the ear, or between uses of the ear bud by different users to preclude carrying cerumen from one persons ear to another. While replacement ear bud covers are commercially available, they are so thin, flexible, and resiliently stretchable that they are difficult for many individuals to place over the car buds.

DISCLOSURE OF THE INVENTION

The present invention provides a phone cover in an assembly that affords easy application of a phone cover around a bulbous phone such as an ear bud, even by persons with limited manual dexterity.

The phone cover in the assembly according to the present invention is of thin, flexible, resiliently stretchable material that defines a socket and is adapted to closely receive a phone in the socket. The assembly includes a frame of stiff material. The phone cover is supported from the frame with an inlet opening to the socket aligned with a passageway defined by the frame. The phone or ear bud can be moved along the passageway into the socket in the phone cover; whereupon the cover on the phone can be easily separated from the frame.

Using this assembly a phone such as an ear bud can be covered by simply supporting the frame (manually or otherwise) while moving the phone along the passageway defined by the frame into the socket in the phone cover; and separating the phone with the cover around it from the frame.

In certain embodiments of the assembly described herein the passageway defined by the frame is a through opening in the frame that is generally circular, and the phone cover is supported from the frame by a support layer of thin flexible material attached to the phone cover along and around its inlet opening and extending outwardly from the phone cover to a portion of the frame that defines the through opening. The phone cover includes an outer part of sound transmissive material having a generally circular periphery, and an adjacent washer-like part having a circular outer periphery bonded to the periphery of the outer part and having a concentric circular inner edge portion defining a through opening and being bonded to the support layer. The phone cover has lines of weakness adjacent that inner edge portion to afford separation of the phone cover from the frame. Also, the support layer and/or the frame can have lines of weakness to afford manually separating them into parts to facilitate removal of the phone with the cover around it from the support layer and/or the frame.

In other embodiments of the assembly described herein the phone cover is defined by two pieces of sheet material each including a bulbous portion that is generally bulbous shaped about a central axis and has a base with opposite sides. The peripheries of the bulbous portions of the pieces of sheet material are bonded together so that those bulbous portions form the phone cover. One or both of the pieces of sheet material also have support portions with edges extending away from opposite sides of the bases of the bulbous portions. Those support portions are attached to a portions of the frame that define the passageway to provide a support layer between the frame and the inlet opening to the socket in the phone cover. The pieces of sheet material can have lines of weakness between their bulbous portions and their support portions to afford separation of the phone cover from support layer; and, if needed, the support layer and/or the frame can include lines of weakness along which they can be broken to facilitate removal of the phone with the cover around it from the frame and/or the support layer. In one of those embodiments the passageway is a generally circular through opening, a support portion is provided on both pieces of sheet material, and the phone cover projects with the axis of the bulbous portions disposed at about a right angle to the major surfaces of the frame. In the other of those embodiments the passageway extends along one side of the frame, a support portion is provided on one or on both pieces of sheet material, and the phone cover is aligned with the passageway with the axis of the bulbous portions disposed generally parallel to the major surfaces of the frame.

In yet another embodiment of the assembly the phone cover is turned inside surface out and extends over a support portion of the frame that defines the passageway as a through opening in the frame with an end portion of the phone cover extending across the through opening. When a phone such as an ear bud is pressed against that end portion of the phone cover and moved through the through opening in the frame, the phone cover will be turned outer surface out and its inner surface will extend around the phone to position the phone in the socket in the phone cover.

BRIEF DESCRIPTION OF DRAWING

The present invention will be further described with reference to the accompanying drawing wherein like reference numerals refer to like parts in the several views, and wherein:

FIG. 8 illustrates an ear bud together with an enlarged sectional view of the assembly of FIG. 7 taken approximately along section line 8—8 of FIG. 7 and inverted;

FIG. 9 is a perspective view illustrating a step in making the assembly of FIGS. 7 and 8;

FIG. 10 is a perspective view of a fourth embodiment of an assembly according to the present invention;

FIG. 11 is an enlarged sectional view of the assembly of FIG. 10 taken approximately along line 11—11 of FIG. 10;

DETAILED DESCRIPTION OF THE INVENTION

Figure 1:
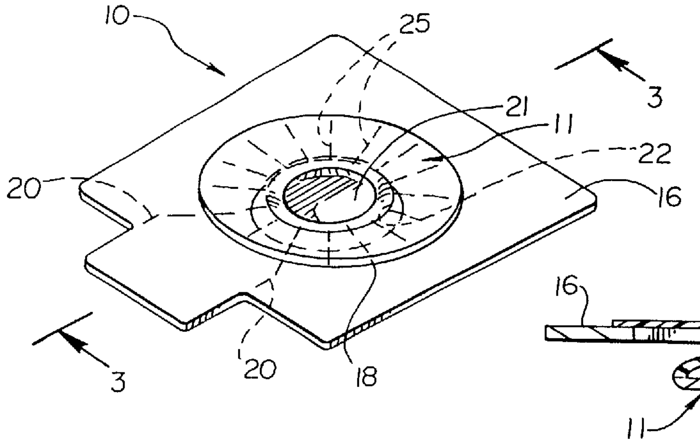
FIG. 1 is a perspective view of a first embodiment of an assembly according to the present invention.
Figure 2:
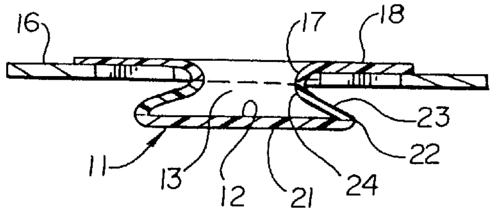
FIG. 2 is a side view of the assembly of FIG. 1.
Figure 3:
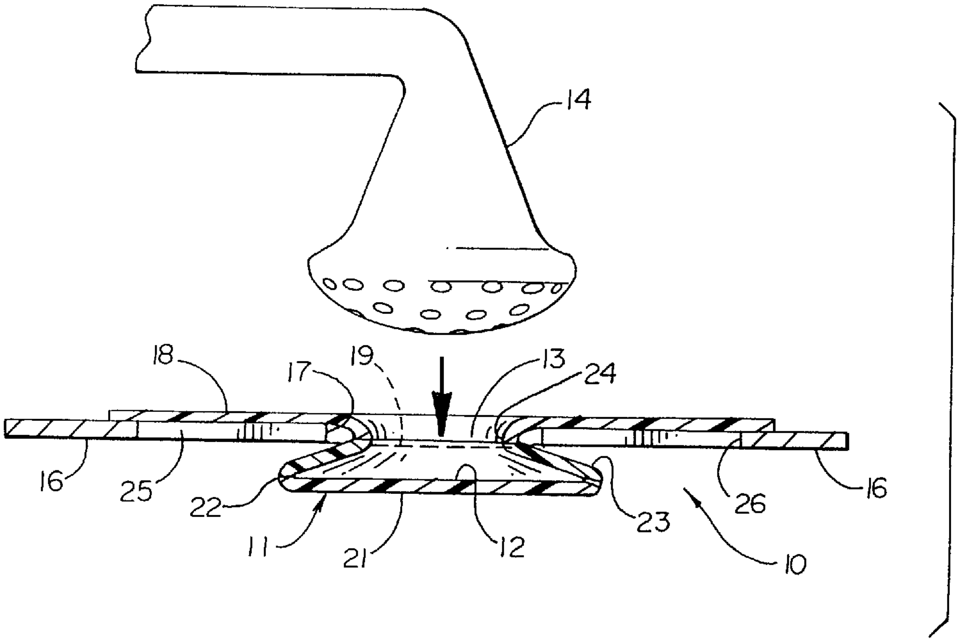
FIG. 3 illustrates an ear bud together with an enlarged sectional view of the assembly of FIG. 1 taken approximately along section line 3—3 of FIG. 1 and inverted.

Referring now to FIGS. 1 through 3 of the drawing, there is illustrated a first embodiment of an assembly according to the present invention generally designated by the reference numeral 10. The assembly 10 includes a phone cover 11 of thin, flexible, resiliently stretchable material defining a socket 12 having an inlet opening 13. The phone cover 11 is particularly adapted to closely receive a bulbous ear phone 14 of the type called an ear bud that is inserted into the socket 12 through the inlet opening 13. The assembly 10 is adapted to facilitate easy insertion of the ear bud 14 into the socket 12 in the phone cover 11 by including a frame 16 of stiff material (e.g., 24 point (0.024 inch or 0.06 cm thick) polyethylene coated cardboard or a stiff polymeric film such as a 0.02 inch or 0.05 cm thick polyethylene or polypropylene) having a passageway in the form of a through opening 17 extending between opposite major surfaces of the frame 16, and a support layer 18 of thin flexible material attached to the phone cover 11 along and around the inlet opening 13 and extending outwardly from the phone cover 11 to a portion of the frame 16 defining the through opening 17. The support layer 18 is attached to the frame 16 (e.g., by a heat seal between the support layer 18 and the frame 16 or by a suitable adhesive or mechanical attachment) with the inlet opening 13 of the phone cover 11 generally aligned and concentric with the through opening 17 in the frame 16. The frame 16 is adapted to have the ear bud 14 inserted into the socket 12 through the through opening 17 and the inlet opening 13 in the phone cover 11 as indicated in FIG. 3; and the assembly 10 includes means in the form of a line 19 of weakness (e.g., perforations) for affording separation of the cover 11 around the ear bud 14 from the support layer 18 and the frame 16. Also, the frame 16 and the support layer 18 include means in the form of lines 20 of weakness (e.g., perforations and slits) leading to the edges of a projecting tab like portion of the frame 16 that facilitates breaking the frame 16 and support layer 18 into parts to remove them from around the ear bud 14 within the phone cover 11.

The ear bud 14 can thus be covered with the phone cover 11 by supporting the frame 16 either manually or otherwise while manually inserting the ear bud 14 into the socket 12 through the through opening 17 and the inlet opening 13 in the phone cover 1 as is indicated by the arrow in FIG. 3; and then separating the cover 11 around the ear bud 14 from the support layer 18 and the frame 16 at the line 19 of weakness. The support layer 18 and frame 16 can then be broken apart along at least one of the lines 20 of weakness to facilitate removing them from around the ear bud 14 covered by the phone cover 11.

As is best seen in FIGS. 2 and 3, the phone cover 11 in the assembly 10 includes an outer part 21 having a generally circular periphery 22, and an adjacent washer-like part 23 having a circular outer periphery attached or bonded to the periphery 22 of the outer part 21 and having a concentric circular inner edge portion 24 defining a through opening and being attached or bonded to the support layer 18. The frame 16 has opposite major surfaces or sides, with the support layer 18 being attached to the frame 16 along one side. The support layer 18 and/or the washer-like part 23 extend through the opening 17 in the frame 16, and the outer part 21 of the phone cover 11 is positioned on the side of the frame 16 opposite that to which the support layer 18 is attached. As illustrated, the washer-like part 23 of the phone cover 11 has the line 19 of weakness adjacent its inner edge portion to provide the means affording separation of the phone cover 11 from the support layer 18 and the frame 16, however, that means could alternatively be afforded by a line of weakness in the support layer 18, or a separable attachment between the support layer 18 and the washer-like part 23.

The through opening 17 in the frame 16 is smaller in diameter than the outer part 21 of the phone cover 11, and the frame 16 has slits 25 extending radially from the though opening 17 forming cantilevered portions of the frame 16 around the through opening 17 that are flexible and/or bendable at a line of perforations 26 encircling their proximal ends to afford movement of the ear bud 14 through the through opening 17 and into the socket 12 in the phone cover 11.

The phone cover 11 is adapted to be positioned around the ear bud 14 with its outer part 21 extending across the speaker in the ear bud 14. Thus the outer part 21 should be of a thin, flexible, resiliently stretchable material that is also quite sound transmissive (e.g., of 110 PPI (pores per inch) porous filter foam commercially available from Foamex, Eddystone, Pa., or of a nylon mesh). The washer-like part 23 of the phone cover 11 is intended to extend around portions of the ear bud 14 surrounding its speaker and thus can be made of a thin flexible resiliently stretchable material that may or may not be as sound transmissive as the outer part 21, and which may be more slippery than the outer part 21 and to facilitate insertion of the ear bud 14 (e.g., a nylon film or mesh which is inherently slippery, or material like the 110 PPI filter foam or a urethane film which, optionally, may be coated with a slipping agent such as talc). The support layer 18 is not part of the phone cover 11 and thus can be made of a thin flexible material that may or may not be as resiliently stretchable as the outer part 21 or the washer-like part 23, or as sound transmissive as the outer part 21 and may also be more slippery than the outer part 21 to facilitate insertion of the ear bud 14 (e.g., a nylon film or mesh which is inherently slippery, or material like the 110 PPI filter foam or a urethane film which, optionally, may be coated with a slipping agent such as talc).

Figure 4A:
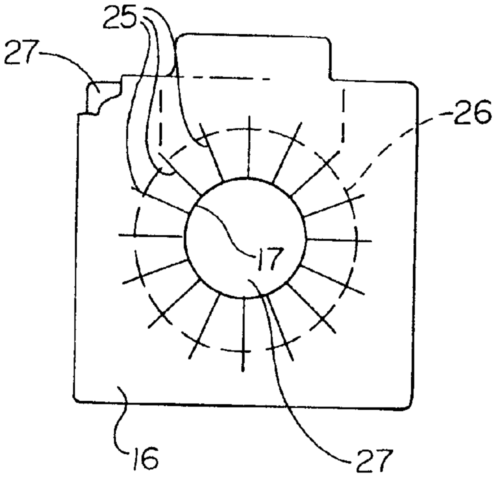
FIGS. 4*a*, 4*b*, 4*c*, and 4*d* are plan views sequentially and schematically illustrating making the assembly of FIG. 1.
Figure 4B:
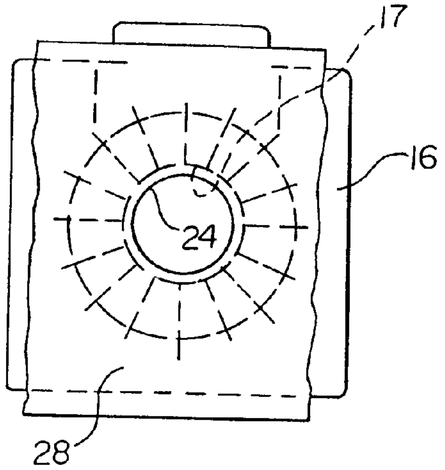
Figure 4C:
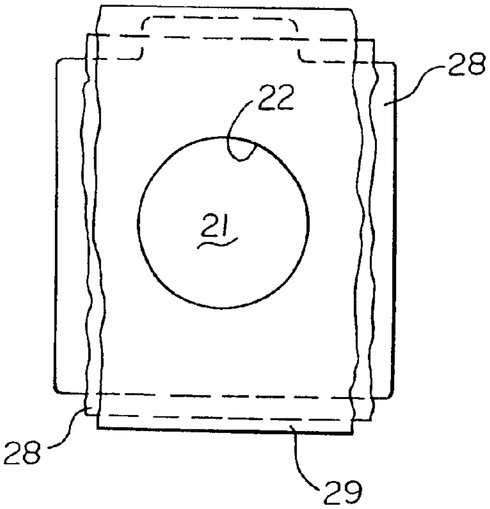
Figure 4D:
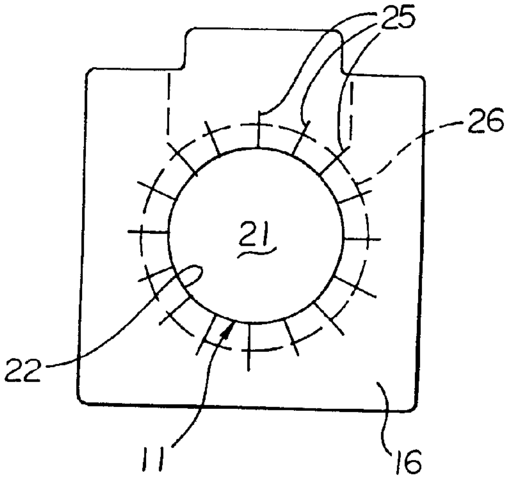

Generally, a method for forming the assembly 10 comprises the steps of (1) providing the frame 16 with its through opening 17; (2) constructing the phone cover 11; (3)

attaching the support layer 18 to the phone cover 11 along and around its inlet opening 13 and to the portion of the frame 16 defining the through opening 17 with the inlet opening 13 to the phone cover 11 generally aligned and concentric with the through opening 17 in the frame 16; and (4) causing the line 19 of weakness that affords separation of the phone cover 11 from the support layer 18 and the frame 16. The phone cover 11 can be constructed and the support layer 18 can be attached by the steps sequentially and schematically illustrated from left to night in FIGS. 4*a*, 4*b*, 4*c*, and 4*d* of (1) attaching a piece 27 of the thin flexible material from which the support layer 18 is to be formed to one side or major surface of the frame 16 with that piece 27 of material extending across the through opening 17 in the frame 16 (FIG. 4*a*); (2) positioning a piece 28 of the thin flexible resiliently stretchable material from which the washer-like part 23 is to be made along the opposite side or major surface of the frame 16 and over the through opening 17 in the frame 16 (FIG. 4*b*); (3) forming the through opening defined by the inner edge portion 24 of the washer-like part 23 and a corresponding through opening in the support layer 18 in portions of the pieces 27 and 28 of materials extending across the through opening 17 in the frame 16 (FIG. 4*b*); (4) attaching or bonding the pieces 27 and 28 of materials to each other along and around the through openings formed by the step of forming the through opening defined by the inner edge portion 24 (FIG. 4*b*)(i.e., such forming and attachment steps (3) and (4) can be performed simultaneously by use of a heated die or punch if the flexible materials are appropriate thermoplastics ); (5) positioning a piece 29 of the thin, flexible, resiliently stretchable, sound transmissive material from which the outer part 21 is to be made along the surface opposite the frame 16 of the piece 28 of material from which the washer-like part 23 is to be made after the steps of forming the through openings and attaching the pieces 27 and 28 of materials to each other along and around the through openings (FIG. 4*c*); (6) forming against the cantilevered portions of the frame 16 the circular periphery 22 of the outer part 21 and the outer periphery of the washer-like part 23 in the pieces 28 and 29 of materials from which the outer and the washer-like parts 21 and 23 are to be made (FIG. 4*c*); (7) attaching or bonding the pieces 28 and 29 of materials to each other along and around the circular and outer peripheries 22 formed by the step of forming against the cantilevered portions of the frame 16 (FIG. 4*c*) (i.e., such forming and attachment steps (6) and (7) can be performed simultaneously by use of a heated die or punch if the flexible materials are both appropriate thermoplastics); and (9) removing the parts of the pieces 27, 28, and 29 of materials not needed for making the assembly 10 (FIG. 4*d*).

By reviewing FIGS. 4*a*, 4*b*, 4*c*, and 4*d* it can be seen that a multiplicity of the frames 16 can be provided along a strip of material from which the frames 16 are made and moved along a path, the pieces 27, 28 and 29 of materials from which the support layers 18, the outer parts 21 and the washer-like parts 23 are made can be supplied in strips guided to positions on the path along which the strip of frames 16 is moved, and the steps for forming the assemblies 10 can be performed sequentially along the frames 16 in the strip moved along that path generally in the sequence described above to form a concatenation of the assemblies 10 including phone covers 11.

Figure 5:
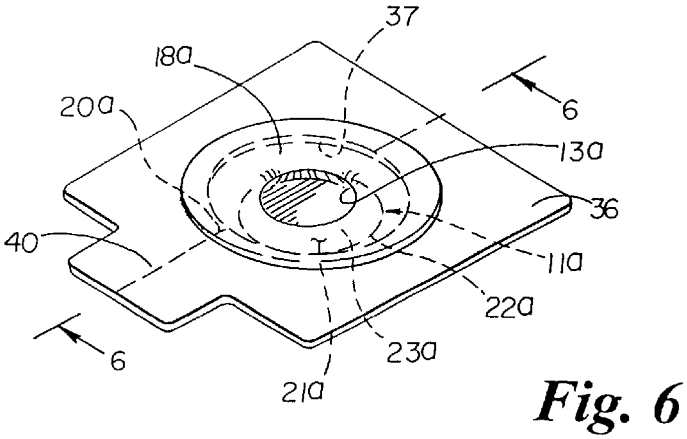
FIG. 5 is a perspective view of a second embodiment of an assembly according to the present invention.
Figure 6:
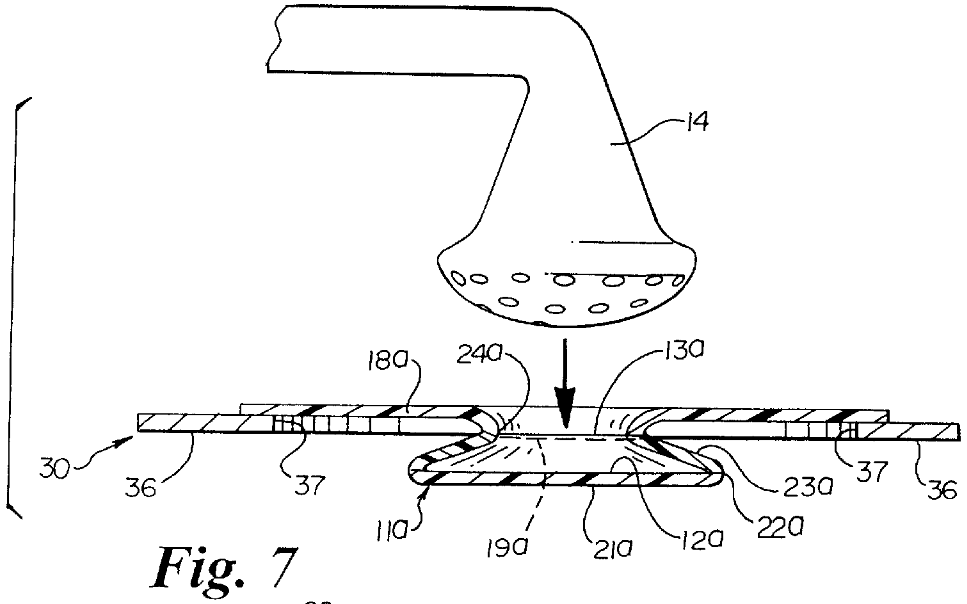
FIG. 6 illustrates an ear bud together with an enlarged sectional view of the assembly of FIG. 5 taken approximately along section line 6—6 of FIG. 5 and inverted.

Referring now to FIGS. 5 and 6 of the drawing, there is illustrated a second embodiment of an assembly according to the present invention generally designated by the reference numeral 30. The assembly 30 includes a phone cover 11 a and a support layer 18*a* that have essentially the same structures as the phone cover 11 and support layer 18 described above, and have their structural elements identified with the same reference numerals used above with respect to the assembly 10 except for the addition of the suffix "a". The phone cover 11*a* is of thin, flexible, resiliently stretchable material, defines the socket 12*a* having an inlet opening 13*a* that is adapted to closely receive the bulbous car phone or ear bud 14, and the support layer 18*a* is of thin flexible material and is attached to the phone cover 11*a* along and around its inlet opening 13*a* and extends outwardly from the phone cover 11*a* to a frame 36; the support layer 18*a* being attached to the frame 36 with the inlet opening 13*a* of the phone cover 11*a* generally concentric with a through circular opening 37 in the frame 36. The assembly 30 primarily differs from the assembly 10 in that the opening 37 in the frame 36 is larger in diameter than the outer part 21*a* of the phone cover 11 which can facilitate inserting the ear bud 14 into the phone cover 11*a*. The support layer 18*a* and the frame 36 can have lines of weakness 20*a* and 40 respectively that allow them to be separated into parts to remove them from around the ear bud 14 within the phone cover 11*a*. The attachments between the support layer 18*a* and the washer-like part 23*a* and between the washer-like part 23*a* and the outer part 21 a can be made with an adhesive or by ultrasonic or thermal welding. If ultrasonic or thermal welding is used, the support layer 18*a* and the washer-like part 23 can be attached together first, and a thermally protecting layer can then be temporarily provided between the support layer 18*a* and the washer-like part 23*a* as the outer part 21*a* is attached to the washer-like part 23*a*.

Figure 7:
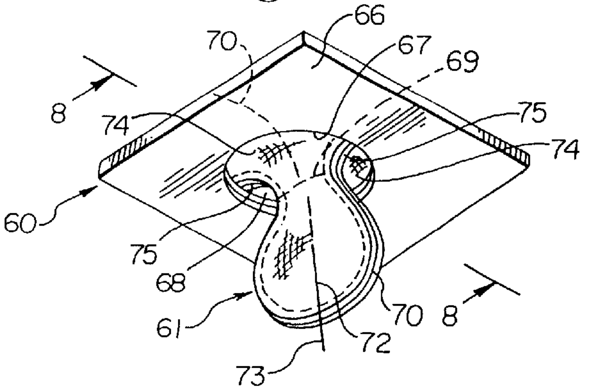
FIG. 7 is a perspective view of a third embodiment of an assembly according to the present invention.

Referring now to FIGS. 7 and 8 of the drawing, there is illustrated a third embodiment of an assembly according to the present invention generally designated by reference numeral 60. The assembly 60 includes a generally flattened phone cover 61 of thin flexible resiliently stretchable material defining a socket 62 having an inlet opening 63. The phone cover 61 is particularly adapted to closely receive a bulbous car phone 64 of the type called an ear bud that is inserted into the socket 62 through the inlet opening 63. The assembly 60 is adapted to facilitate easy insertion of the ear bud 64 into the socket 62 in the phone cover 61 by further including a frame 66 of stiff material (e.g., 24 point (0.024 inch or 0.06 cm thick) polyethylene coated cardboard or a stiff film such as a 0.02 inch or 0.05 cm thick polyethylene or polypropylene) having a circular through opening 67, and a support layer 68 of thin flexible material attached to the phone cover 61 along and around the inlet opening 63 and extending outwardly from the phone cover 61 to the frame 66. The support layer 68 is attached to the frame 66 with the inlet opening 63 of the phone cover 61 generally aligned and concentric with the through opening 67 in the frame 66. The frame 66 is adapted to have the ear bud 64 inserted into the socket 62 through the inlet opening 63 in the phone cover 61 and the opening 67 in the frame 66; and the assembly 60 includes means in the form of a line 69 of weakness (e.g., perforations) for affording separation of the phone cover 61 from the support layer 68. Also, the frame 66 and the support layer 68 include means in the form of lines 70 of weakness (e.g., perforations or slits) facilitating breaking apart the frame 66 and support layer 68 to facilitate removing them from around the ear bud 64 after it is positioned in the phone cover 61.

The phone cover 61 is thus applied to the ear bud 64 by supporting the frame 66 either manually or otherwise while manually inserting the ear bud 64 into the socket 62 through the inlet opening 63 in the phone cover 61 and the opening 67 in the frame 66; and then separating the cover 61 around the ear bud 64 from the support layer 68 and the frame 66 at the line 69 of weakness. The support layer 68 and frame 66 can then be separated into parts along some of its lines 70 of weakness to facilitate removing them from around the ear bud 64 within the phone cover 61.

As is best seen in FIG. 9, the phone cover 61 and the support layer 68 are defined by two pieces of sheet material each including a portion 72 that is generally bulbous shaped about a central axis 73 and has a base with opposite sides. The pieces of sheet material each also include a support portion 74 with edges 75 extending in opposite directions away from opposite sides of the base of the bulbous portion 72 generally at right angles to the axis 73. The edges 75 of the support portions 74 and the peripheries of the bulbous portions 72 are bonded together. The two support portions 74 of the pieces of sheet material are positioned so that they are generally coplanar to form the support layer 68, and are attached along one major surface of the portion of the frame 66 defining the through opening 67 as is seen in FIGS. 7 and 8. The bulbous portions 72 of the pieces of sheet material that form the phone cover 51 then project with their axes 73 generally at a right angle to the generally coplanar support portions 74 through the through opening 67 and away from the side of the frame 66 opposite that to which the support portions 74 are attached. The two pieces of sheet material each have one half of the line 69 of weakness between its bulbous portion 72 and its support portion 74 to provide the means affording separation of the phone cover 61 from the support layer 68 and the frame 66.

As can be seen from FIG. 9, the phone cover 61 can be constructed by (1) providing the two pieces of sheet material that each include the portion 72 that is generally bulbous shaped about the central axis 73 and has a base with opposite sides, and the support portions 74 with edges 75 extending in opposite directions away from opposite sides of the base of the bulbous portion 72 generally at right angles to the axis 73; (2) bonding together the edges 75 of the support portions 74 and the peripheries of the bulbous portions 72, the bonded bulbous portions 72 forming the phone cover 61 and the bonded Support portions 74 forming the support layer 68; and (3) attaching the support portions 74 or support layer 68 to the frame 66 as shown in FIGS. 7 and 8 with the bonded bulbous portions 72 generally aligned and concentric with the through opening 67 in the frame 66. The method can also include providing the lines 70 of weakness in the support layer 68 and in the frame 66 to afford manually separating the support layer 68 and the frame 66 into parts to facilitate removal of the ear bud 64 covered by the phone cover 61 from the support layer 68 and the frame 66.

The phone cover 61 can be positioned around the ear bud 64 with one of the portions 72 extending across the speaker in the ear bud 64 and the other of the portions 72 extending around the side of the car bud 64 opposite its speaker. At least the portion 72 intended to extend across the speaker in the ear bud 64 should be of a thin, flexible, resiliently stretchable material that is also quite sound transmissive (e.g., of 110 PPI porous filter foam or of a nylon mesh). The other portion 72 that is not intended to extend across the speaker in the ear bud 64 can be made of a thin flexible resiliently stretchable material that is not as sound transmissive as the portion 72 intended to extend across the speaker and may be more slippery than the portion 72 intended to extend across the speaker in the ear bud 64 to facilitate insertion of the ear bud 14 (e.g., a nylon film or mesh which is inherently slippery, or material like a urethane film which, with the portion 72 intended to extend across the speaker, may optionally be coated with a slipping agent such as talc). Alternatively that other portion 72 can be made of the same thin, flexible, resiliently stretchable sound transmissive material as the portion 72 intended to extend across the speaker (both portions optionally being coated with the slipping agent) which provides the advantage of not requiring a specific orientation of the phone cover 61 on the ear bud 64.

Referring now to FIGS. 10 and 11 of the drawing, there is illustrated a fourth embodiment of an assembly according to the present invention generally designated by the reference numeral 80. The assembly 80 includes a generally flattened phone cover 81 of thin, flexible, resiliently stretchable material defining a socket 82 having an inlet opening 83 , which phone cover 81 is adapted to closely receive an car bud Such as the car bud 64 (see FIG. 8) inserted into the socket 82 through the inlet opening 83). The assembly 80 is adapted to facilitate easy insertion of the ear bud 64 into the socket 82 in the phone cover 81 by including a frame 86 and a support layer 88 between the phone cover 81 and the frame 86. The frame 86 is formed from first and second laminated layers 84 and 85 of stiff material (e.g., 24 point (0.024 inch or 0.06 cm thick) polyethylene coated cardboard or a stiff polymeric film such as a 0.02 inch or 0.05 cm thick polyethylene or polypropylene). The first layer 84 has a U-shaped slot opening through one edge that, with an arcuate depression 79 in the second layer 85 projecting away from the first layer 84, defines a passageway 87 along, one side of the frame 86. The support layer 88 is a generally flattened tube of thin flexible material attached to the phone cover 81 along and around the sides of the inlet opening 83 , extending outwardly from the phone cover 81 to edges of the frame 86 defining the passageway 87, and having an opening 97 along one side at its end opposite the phone cover 81 and over the depression 79. The support layer 88 is attached between the layers 84 and 85 of the frame 86 with the inlet opening 83 of the phone cover 81 generally aligned with the passageway 87 along the side of frame 86. The assembly 80 is adapted to have the ear bud 64 inserted into the socket 82 by positioning it in the opening 97, pressing it into the depression 79 to open the end of the flatted tube formed by the support layer 88, and then moving it along the inner surface of the tube formed by the support layer 88 into the inlet opening 83 in the phone cover 81. The assembly 80 includes a line 90 of weakness (e.g., perforations) extending along the support layer 88 that allow it to rupture as the ear bud 64 moves along its inner surface toward the phone cover 81, and also includes a line 89 of weakness (e.g., perforations) between the phone cover 81 and the support layer 88 for affording separation of the phone cover 81 from the support layer 88 after the ear bud 64 is positioned in the phone cover 81.

The phone cover 81 and the support layer 88 are defined by two pieces of sheet material each including a portion 92 that is generally bulbous shaped about a central axis 93 and has a base with opposite sides, and a support portion 94 with edges 95 extending away from the base of the bulbous portion 92. The peripheries 91 of the bulbous portions 92 are bonded together (e.g., by heat bonding) except along their bases that form the inlet opening 83. The support portions 94 of the pieces of sheet material are positioned so that their major surfaces are generally parallel with those of the frame 86 and have their edges 95 attached together and between the layers 84 and 85 forming the frame 86 so that the two support portions 94 form the support layer 88. The bulbous portions 92 of the pieces of sheet material that form the phone cover 81 then project with their axes 93 generally parallel to the major surfaces of the frame 86. The outer support portion 94 has the opening 97 adapted to receive the ear bud 64 that is above the depression 79 and spaced along the passageway 87 from the phone cover 81.

As illustrated, the second layer 85 of the frame extends across all portions of the U-shaped slot in the first layer 84. Optionally, the second layer 85 could have an opening in place of the depression 79 to facilitate inserting the ear bud 64 into the opening 97, and/or could have an opening adjacent the cover 81 which could facilitate movement of the ear bud into the phone cover 81. Also, the second layer 85 could have a U-shaped slot aligned with and corresponding in size and shape to the U-shaped slot in the first layer 84, or the first layer 84 could be eliminated, and the edges 95 of the support portion 94 could be attached only to the first layer 84.

The car bud 64 can be covered with the phone cover 81 by supporting the frame 86 either manually or otherwise, positioning the ear bud 64 in the opening 97 and pressing it into the depression 79 to separate the support portions 94, and then moving the ear bud 64 between the support portions 94 toward the inlet opening 83 to the phone cover 81 while rupturing the support layer 88 along the line 90 of weakness as the ear bud 64 moves along its inner surface, whereupon the ear bud 64 will be directed by the inner surface of the separating tube-like support layer 88 through the inlet opening 83 into the socket 82 in the phone cover 81. The phone cover 81 can then be separated from the support layer 88 at the line 89 of weakness.

The assembly 80 can be constructed by providing the two pieces of material each including the portion 92 that is generally bulbous shaped about the central axis 93 and has a base with opposite sides and the support portion 94 with edges 95 extending away from opposite sides of the base of the bulbous portion 92; (2) bonding together the peripheries of the bulbous portions 92 to form the phone cover 81 and the peripheries of the support portions 94 to form the support layer 88, and (3) attaching together the two layers 84 and 85 defining the frame 86 with the edges 95 of the support portion 94 attached between them and to the portions of the frame 86 defining the passageway 87 and with the bonded bulbous portions 92 generally aligned with the passageway 87 in the frame 86.

The phone cover 81 can be positioned around the ear bud 64 with one of the portions 92 extending across the speaker in the ear bud 64 and the other of the portions 92 extending around the side of the ear bud 64 opposite its speaker. At least the portion 92 intended to extend across the speaker in the ear bud 64 should be of a thin, flexible, resiliently stretchable material that is also quite sound transmissive (e.g., of 110 PPI porous filter foam or of nylon mesh). The other portion 92 that is not intended to extend across the speaker in the ear bud 64 can be made of a thin flexible resiliently stretchable material that is not as sound transmissive as the portion 92 intended to extend across the speaker and may be more slippery than the portion 92 intended extending across the speaker in the ear bud 64 to facilitate insertion of the ear bud 64 (e.g., a nylon film or mesh which is inherently slippery, or material like a urethane film which, with the portion 92 intended to extend across the speaker, may optionally be coated with a slipping agent such as talc). Alternatively that other portion 92 can be made of the same thin, flexible, resiliently stretchable sound transmissive material as the portion 92 intended to extend across the speaker (and, optionally, with the portion 92 intended to extend across the speaker, can be coated with that slipping agent) which provides the advantage of not requiring a specific orientation of the phone cover 81 on the ear bud 64.

Figure 12:
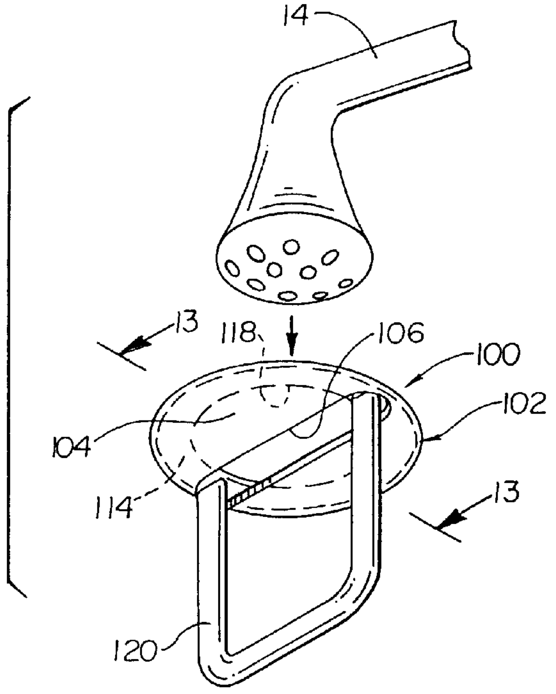
FIG. 12 illustrates an ear bud together with a perspective view of a fifth embodiment of an assembly according to the present invention.
Figure 14:
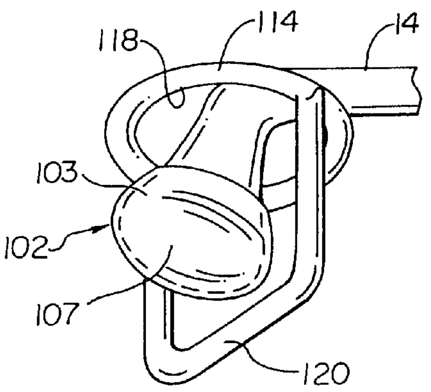
FIG. 14 is a perspective view illustrating a step in using the assembly of FIGS. 12 and 13 to apply a cover included in the assembly to the ear bud.
Figure 13:
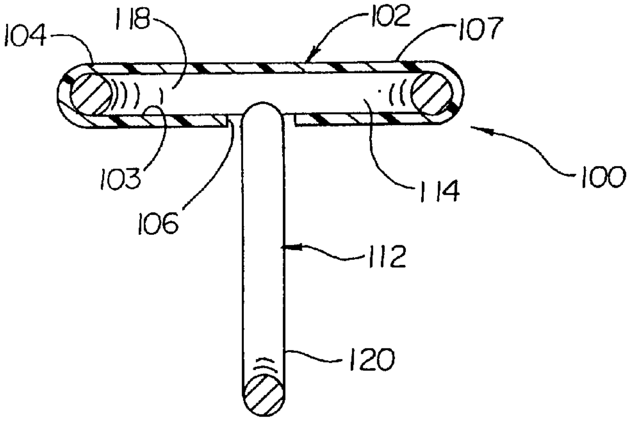
FIG. 13 is an enlarged sectional view of the assembly of FIG. 12 taken approximately along line 13—13 of FIG. 12.

Referring now to FIGS. 12 through 14 there is illustrated a fifth embodiment of an assembly according to the present invention generally designated by the reference numeral 100. Generally the assembly 100 includes an phone cover 102 of thin flexible resiliently flexible material having an outer surface 103, and having an inner surface 104 defining a socket having an inlet opening 106 and having an end portion 107 opposite its inlet opening 106. The inner surface 104 of the phone cover 102 is adapted to closely receive the ear bud 14. Also included in the assembly 100 is a frame 112 of stiff wire-like material (e.g., a weldment of metal wire pieces or a molding of polymeric material). The frame 112 includes a circular support portion 114 having an inner surface defining a passageway in the form of a through opening 118 of a size adapted to just have the ear bud 14 covered by the phone cover 102 pass through the opening 118. The phone cover 102 is inverted or turned inner surface 104 out and extends and is supported around the outer surface of the support portion 114 with its end portion 107 extending across the through opening 118. When the ear bud 14 is pressed against the end portion 107 of the phone cover 102 and moved through the through opening 118, the phone cover 102 will be turned outer surface 103 out and its inner surface 104 will extend around the ear bud 14 to position the ear bud 14 in the socket in the phone cover 102 as is illustrated in FIG. 14. The ear bud 14 covered by the phone cover 102 can then be withdrawn through the opening 118 in the frame 112.

The frame 112 also includes a generally U-shaped handle portion 120 having its ends attached to opposite sides of the support portion 114 and extending away from one side of the support portion 114 through the inlet opening 106 in the inverted phone cover 102. That handle portion 102 is adapted for manual engagement to hold the frame 112 when the ear bud 14 is pressed against the end portion 107 of the phone cover 102 and moved through the through opening 118 to cover it.

The support portion 114 is described and illustrated as generally circular. Alternatively, the support portion 114 could be semi-circular or generally U-shaped to provide an opening through one side of the support portion that could facilitate removing the ear bud 14 covered by the phone cover 102 from the frame 112.

The present invention has now been described with reference to several embodiments thereof. It will be apparent to those skilled in the art that many changes can be made in the embodiments described without departing from the scope of the present invention. The assemblies can be used or adapted to apply covers to phones other than ear buds, such as phones of the type used on stethoscopes or otoscopes, or speaker phones larger than ear buds of the type intended to rest against the outer surface of the ear. Also, the assemblies can be used or adapted to apply covers for hygienic purposes such as to microphones, publicly used telephone mouthpieces, or earpieces used for various purposes by a series of different people. Thus, the scope of the present invention should not be limited to the structures, methods and/or uses described in this application, but only by the strictures, methods and/or uses described by or included in the language of the claims and the equivalents thereof.

What is claimed is:

1. An assembly comprising:

a phone cover of thin, flexible, resiliently stretchable material defining a socket having an inlet opening, said phone cover being adapted to closely receive a bulbous phone inserted into the socket; and a frame of stiff material having a passageway;

said phone cover being supported on said frame with said inlet opening aligned with said passageway to facilitate insertion of the phone through said inlet opening into the socket in the phone cover by movement of the phone along the passageway; and said phone cover being separable from said frame upon insertion of the phone into the socket in the phone cover.

2. An assembly according to claim 1, wherein said phone cover is supported from said frame at said inlet opening by a support layer of thin flexible material attached to said phone cover along said inlet opening and extending from said phone cover to a portion of said frame defining said passageway.

3. An assembly according to claim 2, wherein said passageway is a through opening in said frame, said phone cover includes an outer part having a generally circular periphery, and an adjacent washer-like part having a circular outer periphery bonded to the periphery of said outer part and having and a concentric circular inner edge portion generally defining said inlet opening, said inner edge portion being bonded to said support layer and said support layer extending from said inner edge portion to said frame around said through opening.

4. An assembly according to claim 3, wherein said washer-like part of said phone cover has lines of weakness adjacent said inner edge portion to afford separation of said phone cover from said support layer.

5. An assembly according to claim 3, wherein said through opening in said frame is larger than said outer part of said phone cover.

6. An assembly according to claim 3, wherein said through opening in said frame is smaller than said outer part of said phone cover, and said frame has slits extending radially from said though opening forming portions of said frame around said through opening that are flexible to afford movement of the phone through said through opening.

7. An assembly according to claim 2, wherein said frame has opposite major surfaces, said passageway is a through opening in said frame between said major surfaces, said phone cover and said support layer are defined by two pieces of sheet material each including a portion that is generally bulbous shaped about a central axis and has a base with opposite sides, said pieces of sheet material each also including a support portion with edges extending in opposite directions away from opposite sides of the base of said bulbous portion generally at right angles to said axis, the peripheries of said bulbous portions being attached together, the two support portions of the pieces of sheet material are generally coplanar, form said support layer, and are attached to said frame along one of said surfaces, said bulbous portions of said pieces of sheet material form said phone cover and project with said axes generally at a right angle to said generally coplanar support portions, said support layer extends from said support layer to said frame around said through opening; and said pieces of sheet material have lines of weakness between said bulbous and support portions to afford separation of said phone cover from said support layer.

8. An assembly according to claim 2, wherein said frame and support layer include lines of weakness facilitating breaking said frame and said support layer to facilitate removal of said frame and said support layer from around a phone received in the socket in the phone cover.

9. An assembly according to claim 2, wherein said phone cover is defined by two pieces of sheet material each including a portion that is generally bulbous shaped about a central axis and has a base with opposite sides, at least one of said pieces of sheet material also including a support portion with edges extending away from the base of said bulbous portion on opposite sides of said axis, the peripheries of said bulbous portions being attached together, and the support portion of the piece of sheet material forming said support layer and being attached to said frame along said edges of said support portion, said bulbous portions of said pieces of sheet material forming said phone cover being positioned with said axes generally parallel to said frame.

10. An assembly according to claim 9, wherein said frame comprises first and second laminated layers of material, said first layer having a slot opening through an edge of said first layer with said slot defining said passageway and said passageway extending along one surface of the frame.

11. An assembly according to claim 9, wherein both of said pieces of sheet material include one of said support portions with edges extending away from the base of said bulbous portion on opposite sides of said axis with the support portions of the pieces of sheet material forming said support layer and being attached to said frame along said edges of said support portion, and said support layer includes a line of weakness extending parallel to said passageway to facilitate breaking of said support layer to facilitate movement of the phone along the passageway; said support layer also including a second line of weakness between said phone cover and said support layer to facilitate removal of said phone cover in which a phone is received from said support layer.

12. An assembly according to claim 1, wherein said phone cover has an outer surface, has an inner surface defining said socket, and has an end portion opposite said inlet opening; and said frame of stiff material comprises a support portion having an inner surface defining said passageway as a through opening adapted to have the phone cover with the phone in said socket pass through the through opening;

said phone cover being turned inside surface out and extending over and around said support portion with said end portion extending across said through opening so that when a phone is pressed against said end portion and moved through said through opening said phone cover will be turned outer surface out and said inner surface will extend around the phone to position the phone in said socket in the phone cover.

13. An assembly according to claim 12, wherein the shape of said through opening is selected from the shapes consisting of generally circular, generally semi circular and generally U-shaped.

14. An assembly according to claim 12, wherein said frame further includes a handle portion extending from said support portion through the inlet opening in said phone cover, said handle portion being adapted for manual engagement to hold said frame when the phone is pressed against said end portion and moved through said through opening.

15. A method for covering a phone with a phone cover, said method comprising the steps of:

providing an assembly comprising a phone cover of thin, flexible, resiliently stretchable material defining a socket having an inlet opening, the phone cover being adapted to closely receive a phone inserted into the socket;

providing a frame of stiff material having a passageway, supporting the phone cover from the frame with the inlet opening aligned with the passageway in the frame;

supporting the frame; moving the phone along the passageway into the socket in the phone cover; and separating the covered phone from the frame.

16. A method according to claim 15, wherein said step of separating the covered phone from the frame includes the step of breaking the frame apart.

17. A method according to claim 15, wherein the step of providing a frame provides a frame in which the passageway is a through opening, said step of supporting the phone cover from the frame comprises the step of providing a support layer between the inlet opening of the phone cover and the passageway in the frame; and said step of moving the phone along the passageway into the socket in the phone cover comprises the step of moving the phone through the through opening and along the support layer to and through the inlet in the phone cover.

18. A method according to claim 15, wherein the step of providing a frame provides a frame in which the passageway is a through opening adapted to have the phone cover with the phone in said socket pass through the through opening; said step of supporting the phone cover from the frame comprises the steps of turning the phone cover inside surface out and extending the phone cover over and around the support portion with an end portion of the phone cover extending across the through opening; and said step of moving the phone along the passageway into the socket in the phone cover comprises the steps of pressing the phone against the end portion and moving the phone through the through opening to turn the phone cover outer surface out with the inner surface extending around the phone to position the phone in said socket in the phone cover.

19. A method according to claim 15, wherein the step of providing a frame provides a frame in which the passageway extends along one side of the frame, said step of supporting the phone cover from the frame comprises the step of providing a support layer between the inlet opening of the phone cover and portions of the frame defining the passageway on the frame; and said step of moving the phone along the passageway into the socket in the phone cover comprises the step of moving the phone along the support layer to and through the inlet in the phone cover.

20. An assembly comprising:

a phone cover of thin, flexible, resiliently stretchable material defining a socket having an inlet opening, said phone cover being adapted to closely receive a bulbous phone inserted into the socket;

a frame of stiff material, and a support layer of thin flexible material attached to said phone cover along said inlet opening and extending from said phone cover to a portion of said frame to support said phone cover from said frame at said inlet opening; and means affording manual separation of said phone cover from said support layer after insertion of the phone through said inlet opening into the socket in the phone cover.

* * * * *